(12) United States Patent
Tanaka et al.

(10) Patent No.: US 10,703,574 B2
(45) Date of Patent: Jul. 7, 2020

(54) CONVEYING DEVICE

(71) Applicant: Azbil Corporation, Chiyoda-ku (JP)

(72) Inventors: Mitsuharu Tanaka, Chiyoda-ku (JP);
Hisashi Beppu, Chiyoda-ku (JP);
Yoichi Okawa, Chiyoda-ku (JP)

(73) Assignee: Azbil Corporation, Tokyo (JP)

( * ) Notice: Subject to any disclaimer, the term of this patent is extended or adjusted under 35 U.S.C. 154(b) by 0 days.

(21) Appl. No.: 16/336,627

(22) PCT Filed: Sep. 26, 2016

(86) PCT No.: PCT/JP2016/078268
§ 371 (c)(1),
(2) Date: Mar. 26, 2019

(87) PCT Pub. No.: WO2018/055763
PCT Pub. Date: Mar. 29, 2018

(65) Prior Publication Data
US 2020/0055674 A1    Feb. 20, 2020

(51) Int. Cl.
| B65G 25/06 | (2006.01) |
| F26B 25/00 | (2006.01) |
| B65G 25/08 | (2006.01) |
| B65G 25/10 | (2006.01) |
| B65G 25/12 | (2006.01) |

(52) U.S. Cl.
CPC ............ B65G 25/06 (2013.01); B65G 25/08 (2013.01); F26B 25/003 (2013.01); *B65G 25/10* (2013.01); *B65G 25/12* (2013.01)

(58) Field of Classification Search
CPC ........ B65G 25/12; B65G 25/10; B65G 25/08; E01B 25/34; E01B 25/00; F26B 25/003
USPC .................. 104/48, 50, 102, 130.06, 130.11; 414/152, 154, 176, 215
See application file for complete search history.

(56) References Cited

U.S. PATENT DOCUMENTS

| 3,827,549 A * | 8/1974 | Hunter .................. B65G 25/08 |
| | | 198/740 |
| 5,129,162 A * | 7/1992 | Hemmersbach ....... B65G 65/00 |
| | | 34/217 |
| 6,808,592 B1 * | 10/2004 | Rigali .............. H01J 37/32082 |
| | | 118/719 |

(Continued)

FOREIGN PATENT DOCUMENTS

| JP | 58-180500 U | 12/1983 |
| JP | 6-174895 A | 6/1994 |

(Continued)

OTHER PUBLICATIONS

International Search Report dated Dec. 27, 2016 in PCT/JP2016/078268 filed Sep. 26, 2016.

*Primary Examiner* — Mark A Deuble
(74) *Attorney, Agent, or Firm* — Oblon, McClelland, Maier & Neustadt, L.L.P.

(57) ABSTRACT

A conveying device includes first guide rails 2A, 2B; second guide rails 12A, 12B for being connected to the first guide rails 2A, 2B; a movable holding part that holds the second guide rails 12A, 12B such that the second guide rails 12A, 12B are movable in transverse directions with respect to longitudinal directions of the second guide rails 12A, 12B; and moving parts 3A, 3B that move by being guided by the corresponding first guide rails 2A, 2B and the corresponding second guide rails 12A, 12B.

9 Claims, 12 Drawing Sheets

(56) References Cited

U.S. PATENT DOCUMENTS

| | | | | |
|---|---|---|---|---|
| 7,695,230 B2* | 4/2010 | Selch | ............... | B65G 1/0435 |
| | | | | 34/236 |
| 9,534,842 B1* | 1/2017 | Rivera | ............... | F26B 25/003 |
| 2013/0185952 A1 | 7/2013 | Christ | | |
| 2015/0047951 A1* | 2/2015 | Trebbi | ............... | F26B 5/06 |
| | | | | 198/738 |
| 2016/0152141 A1* | 6/2016 | Ragazzini | ............... | F26B 5/06 |
| | | | | 414/222.01 |

FOREIGN PATENT DOCUMENTS

| | | | |
|---|---|---|---|
| JP | 10-115698 A | 5/1998 | |
| JP | 2001-107301 A | 4/2001 | |
| JP | 2002-302378 A | 10/2002 | |
| JP | 2014-73896 A | 4/2014 | |

* cited by examiner

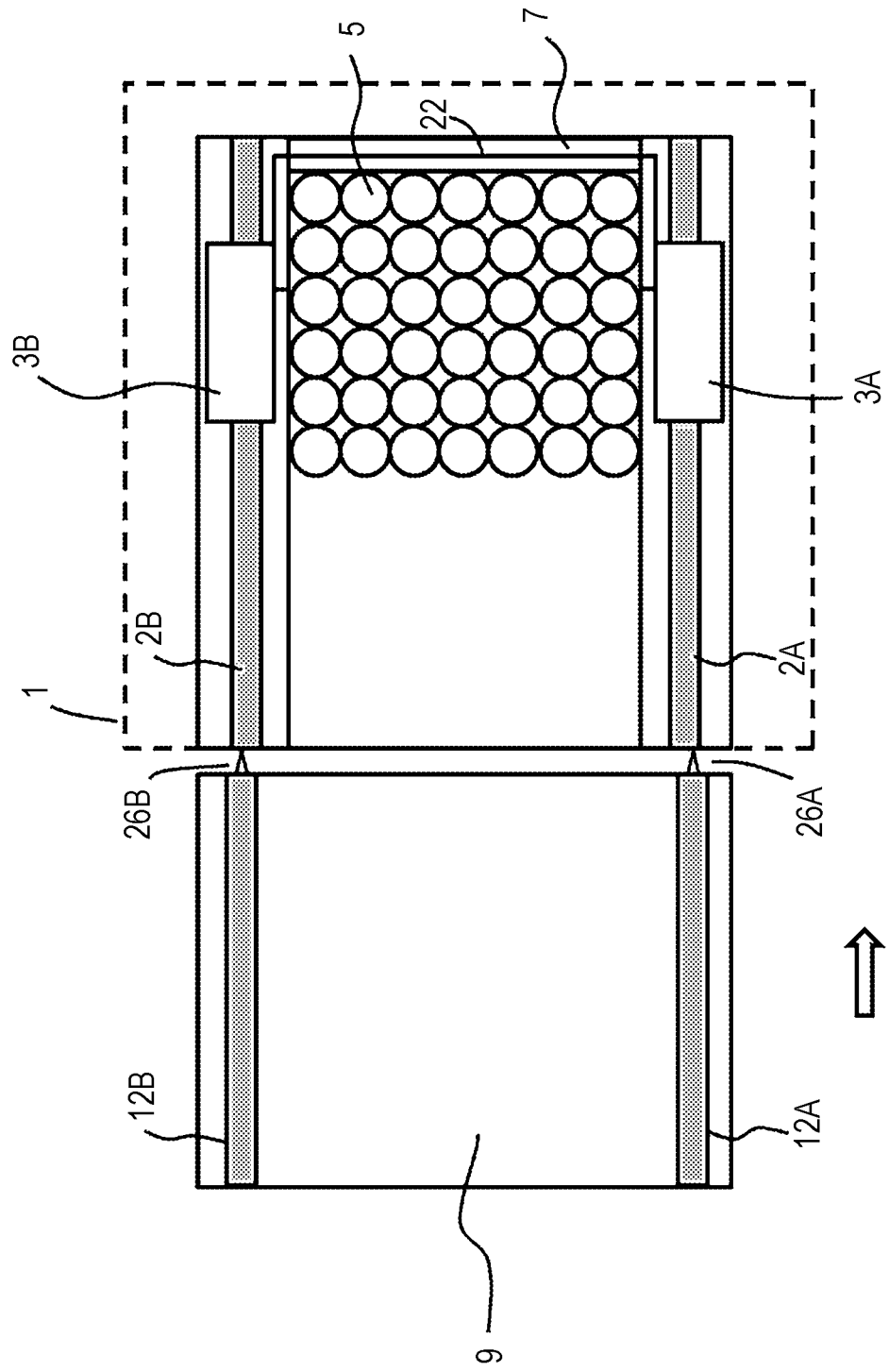

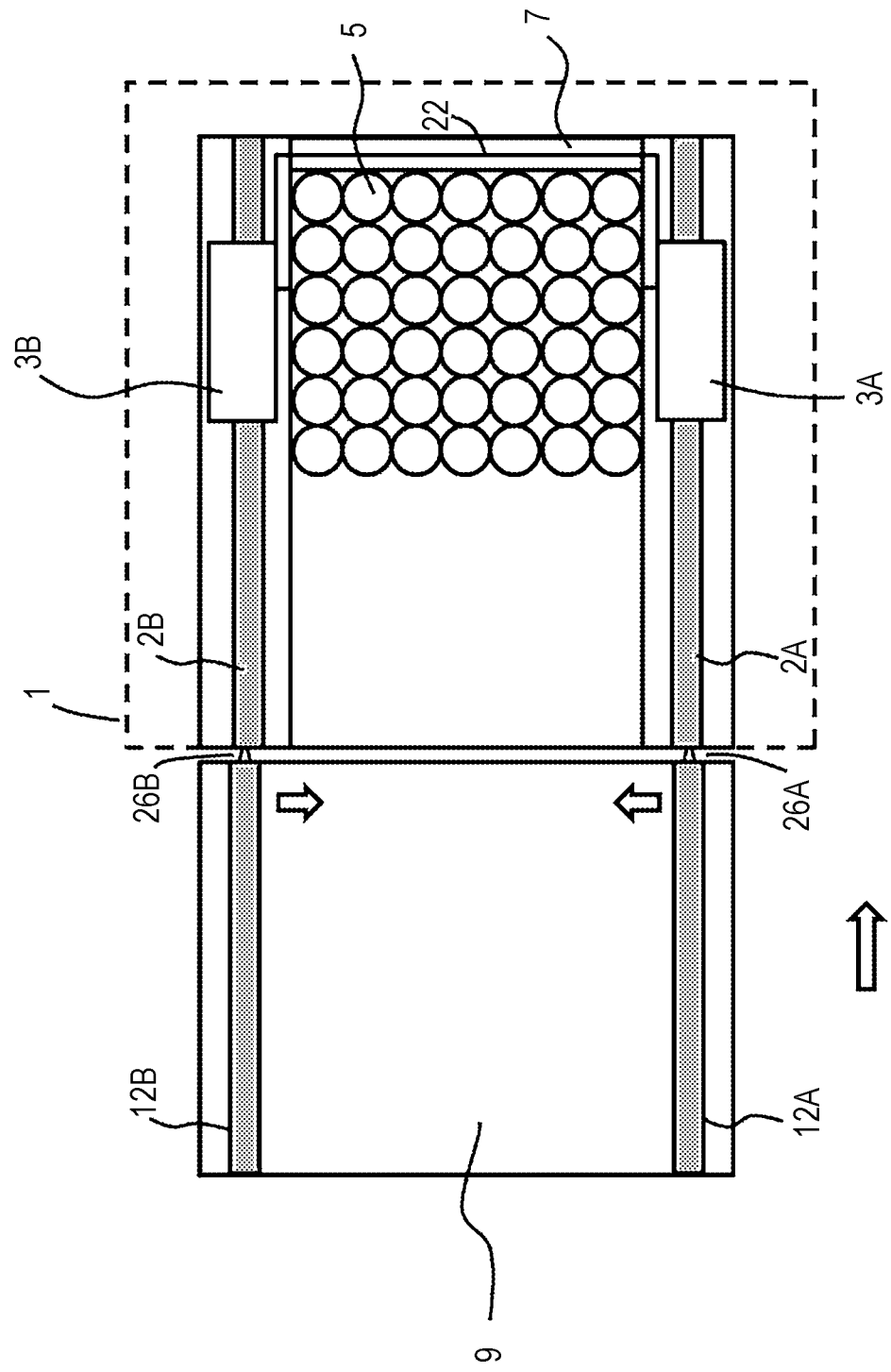

CONVEYING DEVICE

TECHNICAL FIELD

The present invention relates to a conveyance technology, and, in particular, relates to a conveying device.

BACKGROUND ART

Patent Literature 1 discloses a conveying device including a moving part that moves an article into and out of a furnace and that is driven by a linear motor. The moving part moves by being guided by guide rails. When closing the door of the furnace, the guide rail inside the furnace and the guide rail outside the furnace are separated from each other. When conveying an article inside the furnace out of the furnace, the door of the furnace is opened, and the guide rail inside the furnace and the guide rail outside the furnace are connected to each other.

CITATION LIST

Patent Literature

PTL 1: Specification of United States Unexamined Patent Application Publication No. 2013/0185952

SUMMARY OF INVENTION

Technical Problem

When connecting the guide rail inside the furnace and the guide rail outside the furnace to each other, if, in a transverse direction with respect to a longitudinal direction of the guide rail, the guide rail outside the furnace is positioned at a corresponding position, the moving part moves smoothly along a connection portion of the guide rails. However, the position of the guide rail outside the furnace may be displaced in the transverse direction due to, for example, an assembly error or a difference between the temperature inside the furnace and the temperature outside the furnace. Accordingly, it is an object of the present invention to provide a conveying device that is capable of correcting displacement of a guide rail.

Solution to Problem

According to an embodiment of the present invention, there is provided a conveying device including a first guide rail, a second guide rail for being connected to the first guide rail, a movable holding part that holds the second guide rail such that the second guide rail is movable in a transverse direction with respect to a longitudinal direction of the second guide rail, and a moving part that moves by being guided by the first guide rail and the second guide rail.

In the above-described conveying device, the movable holding part may include a deformable member that is disposed parallel to the longitudinal direction of the second guide rail and that is deformable in the transverse direction with respect to the longitudinal direction of the second guide rail, and the second guide rail may be disposed on the deformable member. The deformable member may be plate-shaped. The deformable member may be made of a flexible material.

In the above-described conveying device, the movable holding part may include a first deformable member and a second deformable member that are disposed parallel to the longitudinal direction of the second guide rail and that are deformable in the transverse direction with respect to the longitudinal direction of the second guide rail, and the second guide rail may be disposed on the first deformable member and the second deformable member. The first deformable member and the second deformable member may each be plate-shaped. The first deformable member and the second deformable member may each be made of a flexible material.

The above-described conveying device may further include a first coupler that is provided at an end portion of the first guide rail, and a second coupler that is provided at an end portion of the second guide rail and that is capable of being coupled with the first coupler.

The above-described conveying device may further include a first holding member that holds the first guide rail such that the first guide rail does not move in a transverse direction with respect to a longitudinal direction of the first guide rail.

In the above-described conveying device, the first guide rail may be disposed inside a furnace, and the second guide rail may be disposed outside the furnace. The first guide rail may be disposed along a table that is disposed inside the furnace. The second guide rail may be disposed on a bridge that is disposed outside the furnace, and the bridge may be movable.

In the above-described conveying device, the second guide rail may be disposed inside the furnace, and the first guide rail may be disposed outside the furnace. The second guide rail may be disposed along the table that is disposed inside the furnace. The first guide rail may be disposed on the bridge that is disposed outside the furnace, and the bridge may be movable.

The above-described conveying device may further include a contact member that is connected to the moving part and that is provided for moving an article by coming into contact with the article.

Advantageous Effects of Invention

According to the present invention, it is possible to provide a conveying device that is capable of correcting displacement of a guide rail.

BRIEF DESCRIPTION OF DRAWINGS

FIG. 11 is a schematic top view of the conveying device according to the embodiment.

FIG. 12 is a schematic top view of the conveying device according to the embodiment.

DESCRIPTION OF EMBODIMENTS

An embodiment of the present invention is described below. In the description of the figures below, the same or like portions are denoted by using the same or like symbols. However, the figures are schematic figures. Therefore, for example, specific dimensions should be determined in light of the description below. Naturally, portions having different dimensional relationships and proportions are included even among different figures.

Figure 1:
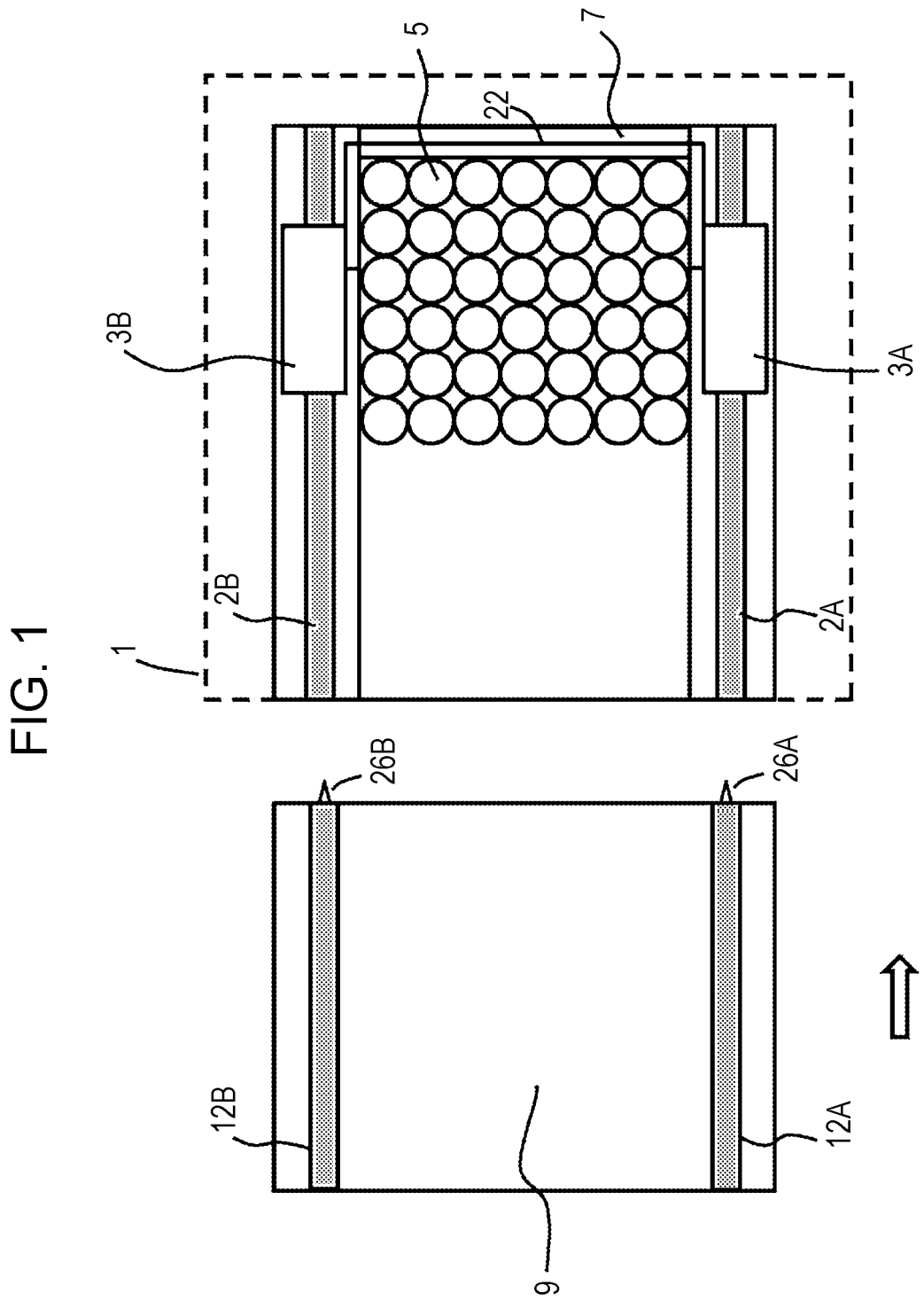
FIG. 1 is a schematic top view of a conveying device according to an embodiment.
Figure 2:
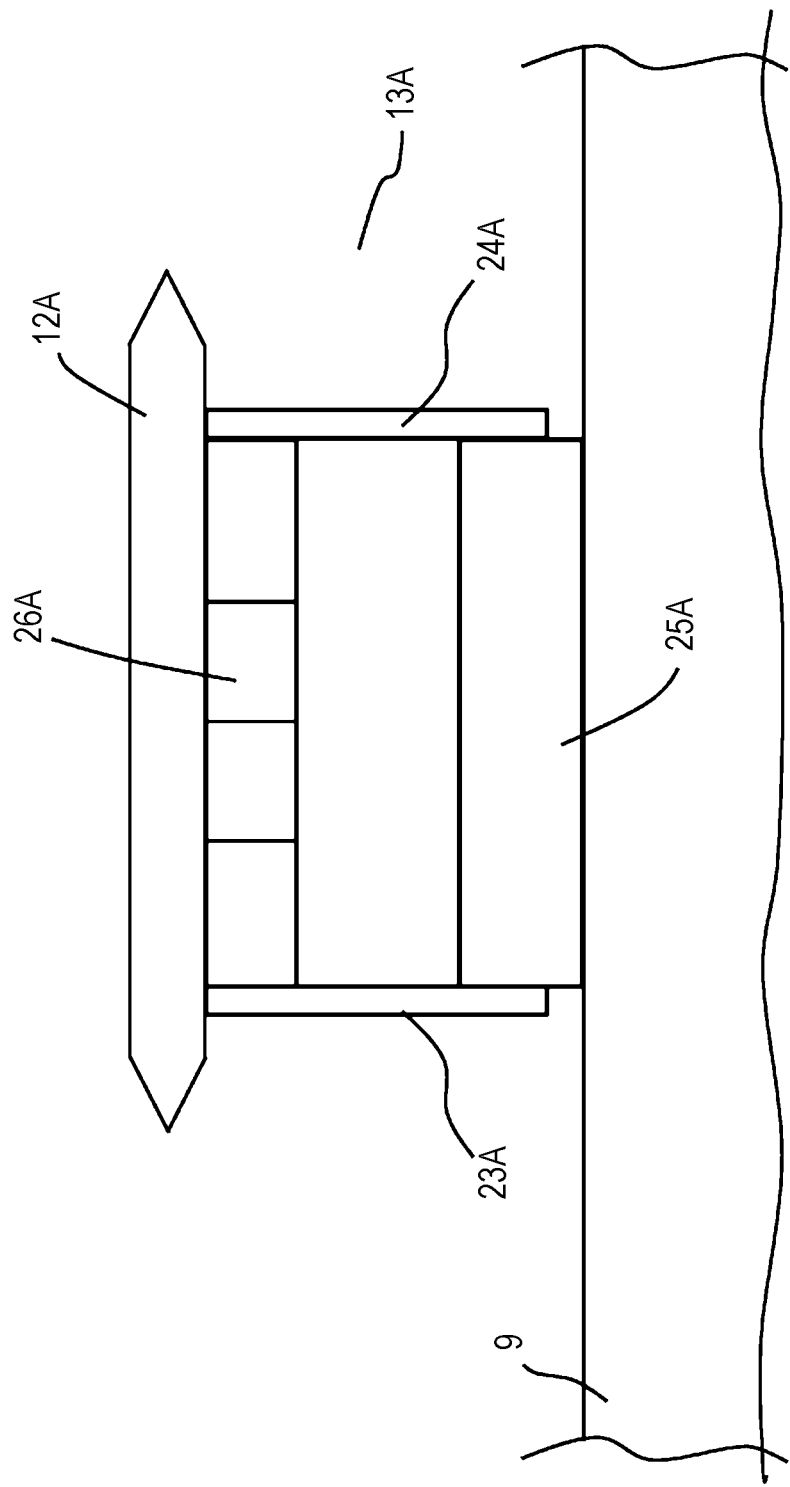
FIG. 2 is a schematic front view of a guide rail, a movable holding part, and a coupler of the conveying device according to the embodiment.
Figure 3:
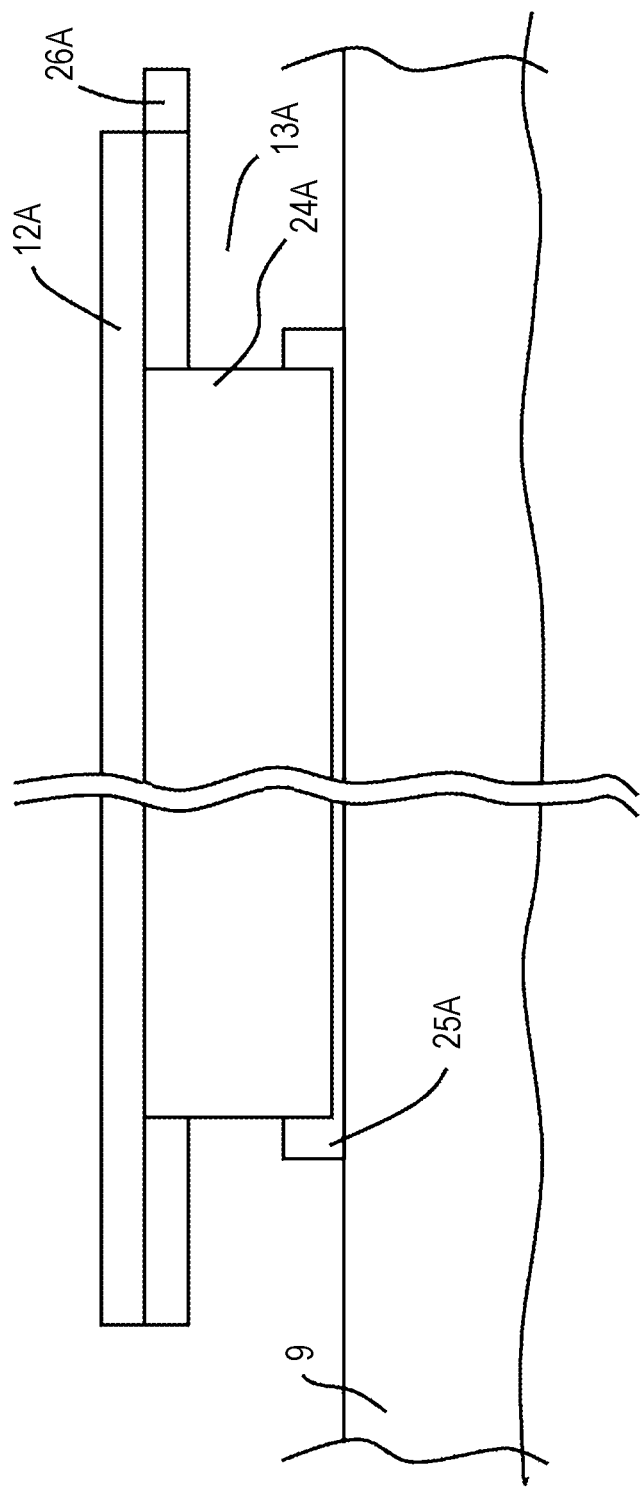
FIG. 3 is a schematic side view of the guide rail, the movable holding part, and the coupler of the conveying device according to the embodiment.
Figure 4:
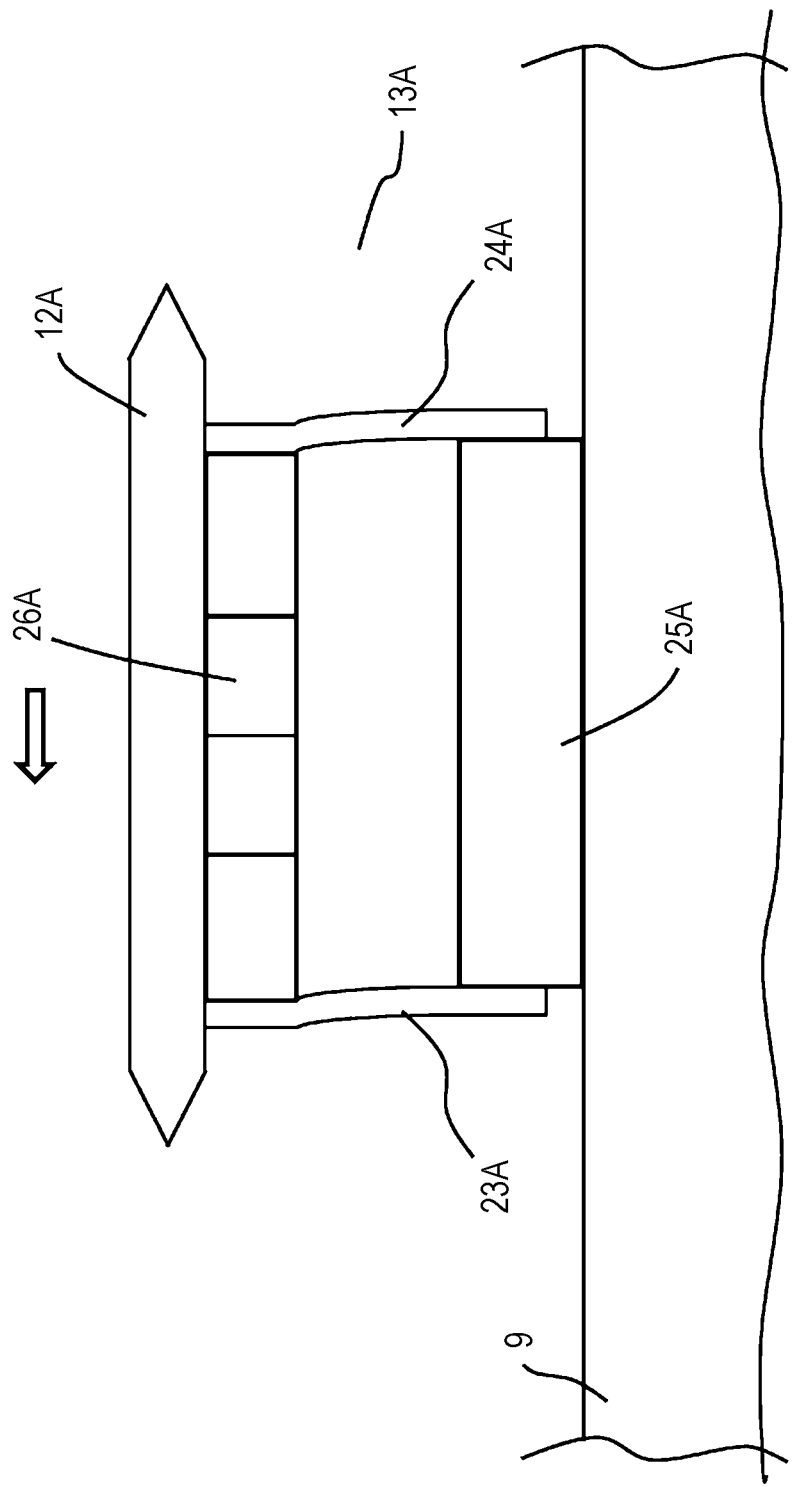
FIG. 4 is a schematic front view of the guide rail, the movable holding part, and the coupler of the conveying device according to the embodiment.
Figure 5:
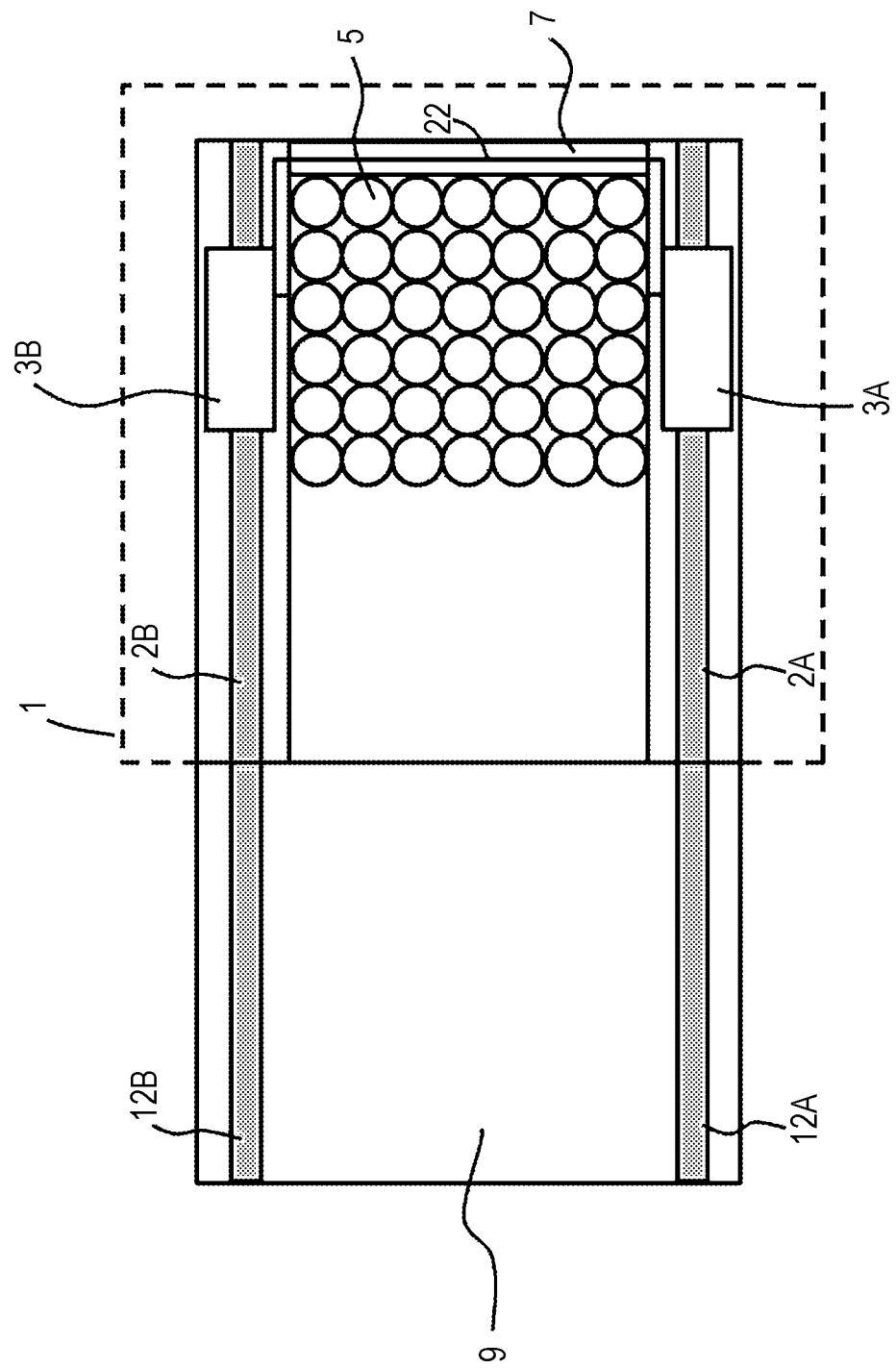
FIG. 5 is a schematic top view of the conveying device according to the embodiment.
Figure 6:
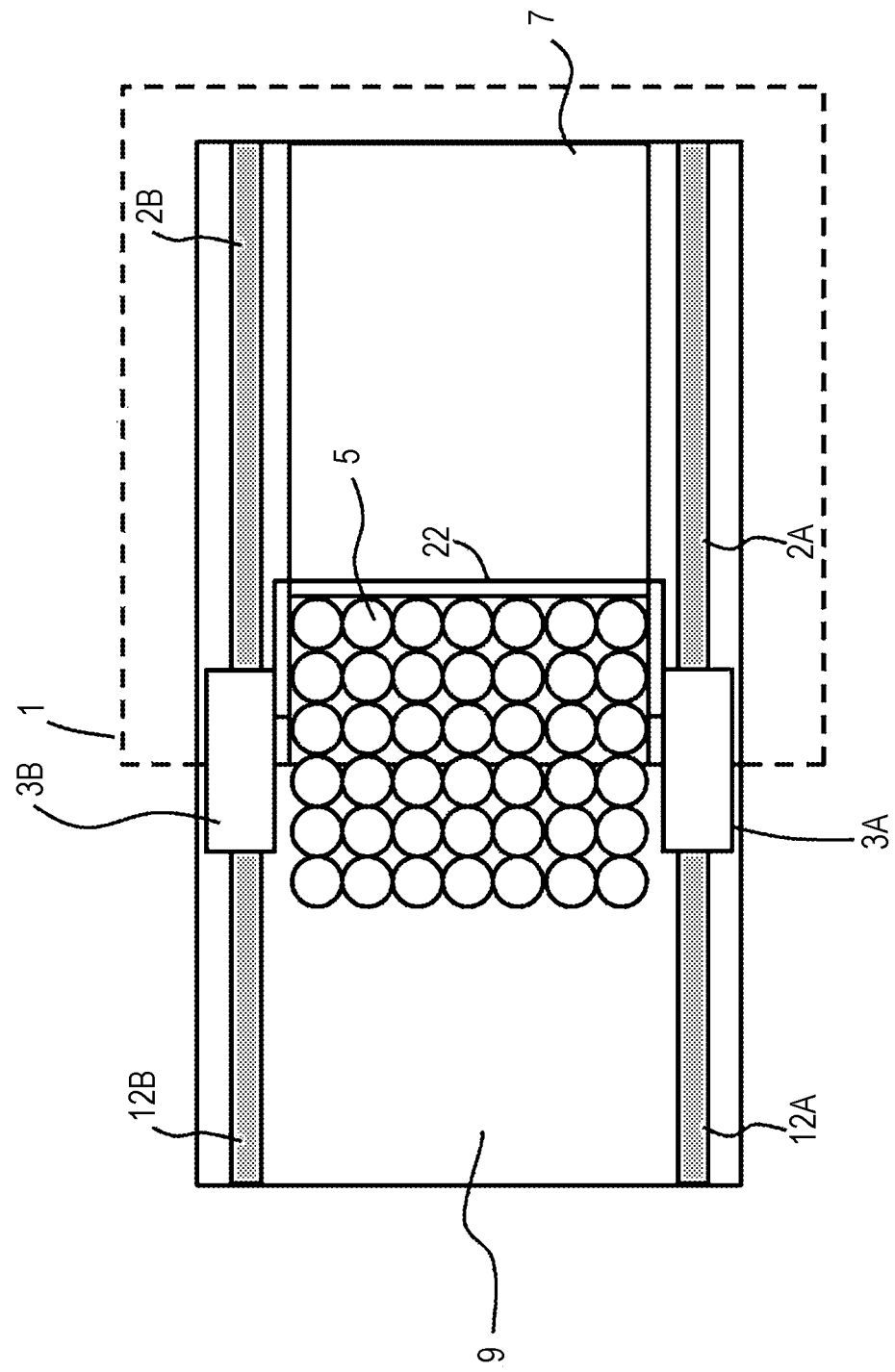
FIG. 6 is a schematic top view of the conveying device according to the embodiment.

A conveying device according to the embodiment includes first guide rails 2A and 2B and second guide rails 12A and 12B for being connected to the corresponding first guide rails 2A and 2B, as shown in FIG. 1; a movable holding part 13A that holds the second guide rail 12A such that the second guide rail 12A is movable in transverse directions with respect to longitudinal directions of the second guide rail 12A as shown in FIGS. 2, 3, and 4; and moving parts 3A and 3B that move by being guided by the corresponding first guide rails 2A and 2B and the corresponding second guide rails 12A and 12B as shown in FIGS. 5 and 6.

The first guide rails 2A and 2B are disposed, for example, inside a furnace 1. The furnace 1 is, for example, a temperature control furnace having a space in which articles 5 are disposed and where the temperature is controlled. The temperature control furnace may be, for example, a freezing drying furnace. The articles 5 are, for example, vial containers into which medicines are injected. When the furnace 1 is a freezing drying furnace, the articles 5 are disposed on a table 7 inside the furnace 1, and, for example, the medicines inside the articles 5 are frozen and dried. The table 7 is, for example, a shelf board. The first guide rails 2A and 2B are disposed along the table 7 where the articles 5 are disposed.

The first guide rails 2A and 2B are held by corresponding fixing holding members such that the first guide rails 2A and 2B do not move in transverse directions with respect to longitudinal directions of the first guide rails 2A and 2B. Transverse directions with respect to longitudinal directions of the first guide rails 2A and 2B are directions perpendicular to the longitudinal directions of the first guide rails 2A and 2B and parallel to a surface of the table 7.

The second guide rails 12A and 12B are disposed outside the furnace 1. The second guide rails 12A and 12B are disposed on a bridge 9. A surface of the bridge 9 is parallel to the surface of the table 7. The bridge 9 is movable, and, when the door of the furnace 1 is closed, the bridge 9 is separated from the furnace 1 as shown in FIG. 1. At this time, the second guide rails 12A and 12B are separated from the corresponding first guide rails 2A and 2B. When the door of the furnace 1 is open, as shown in FIGS. 5 and 6, the bridge 9 approaches and comes into contact with the table 7 inside the furnace 1. At this time, the second guide rails 12A and 12B are connected to the corresponding first guide rails 2A and 2B.

As shown in FIGS. 2, 3, and 4, the movable holding part 13A that holds the second guide rail 12A includes a first deformable member 23A and a second deformable member 23B that are disposed parallel to the longitudinal directions of the second guide rail 12A and that are deformable in the transverse directions with respect to the longitudinal directions of the second guide rail 12A. Transverse directions with respect to the longitudinal directions of the second guide rail 12A are directions perpendicular to the longitudinal directions of the second guide rail 12A and parallel to the surface of the bridge 9. The second guide rail 12A is disposed on the first deformable member 23A and the second deformable member 23B. For example, the first deformable member 23A and the second deformable member 23B are each plate-shaped and are each made of a flexible material.

For example, a lower portion of the second guide rail 12A has a convex structure, and a top portion of the first deformable member 23A and a top portion of the second deformable member 23B are fixed to corresponding side surfaces of the convex structure of the lower portion of the second guide rail 12A. The convex structure of the lower portion of the second guide rail 12A may be integrated with or may be separable from other portions. A lower portion of the first deformable member 23A and a lower portion of the second deformable member 23B, are, for example, fixed to corresponding side surfaces of a fixing member 25A fixed to the bridge 9.

When a force acting in a transverse direction with respect to the longitudinal directions of the second guide rail 12A is applied to the second guide rail 12A, as shown in FIG. 4, the first deformable member 23A and the second deformable table member 23B are flexed in the same direction and by, for example, the same amount. Therefore, the second guide rail 12A moves substantially parallel to the transverse direction.

Similarly to the second guide rail 12A, the second guide rail 12B shown in FIG. 1 is also held by a movable holding part.

A first coupler is provided at an end portion of each of the first guide rails 2A and 2B. The first guide rails 2A and 2B may be integrated with or may be separable from the corresponding first couplers. A second coupler 26A is provided at an end portion of the second guide rail 12A, and a second coupler 26B may be provided at an end portion of the second guide rail 12B. The second guide rails 12A and 12B may be integrated with or may be separable from the corresponding second couplers 26A and 26B. The first couplers and the corresponding second couplers 26A and 26B are coupled when the bridge 9 has approached the table 7. For example, when the second couplers 26A and 26B each have a protruding structure, the first couplers each have a concave structure that is fitted to its corresponding protruding structure. When the second couplers 26A and 26B each have a concave structure, each first coupler has a protruding structure that is fitted to its corresponding concave structure.

As shown in FIGS. 5 and 6, a contact member 22 for moving the articles 5 on the table 7 and the bridge 9 by coming into contact with the articles 5 is connected at a location between the moving parts 3A and 3B. The moving parts 3A and 3B move in synchronism with each other along the corresponding first guide rails 2A and 2B and along the corresponding second guide rails 12A and 12B, to move the articles 5 into and out of the furnace 1 via the contact member 22. The moving parts 3A and 3B may be self-propelled by a linear motor, or may be driven by a magnetic screw (not shown).

Figure 7:
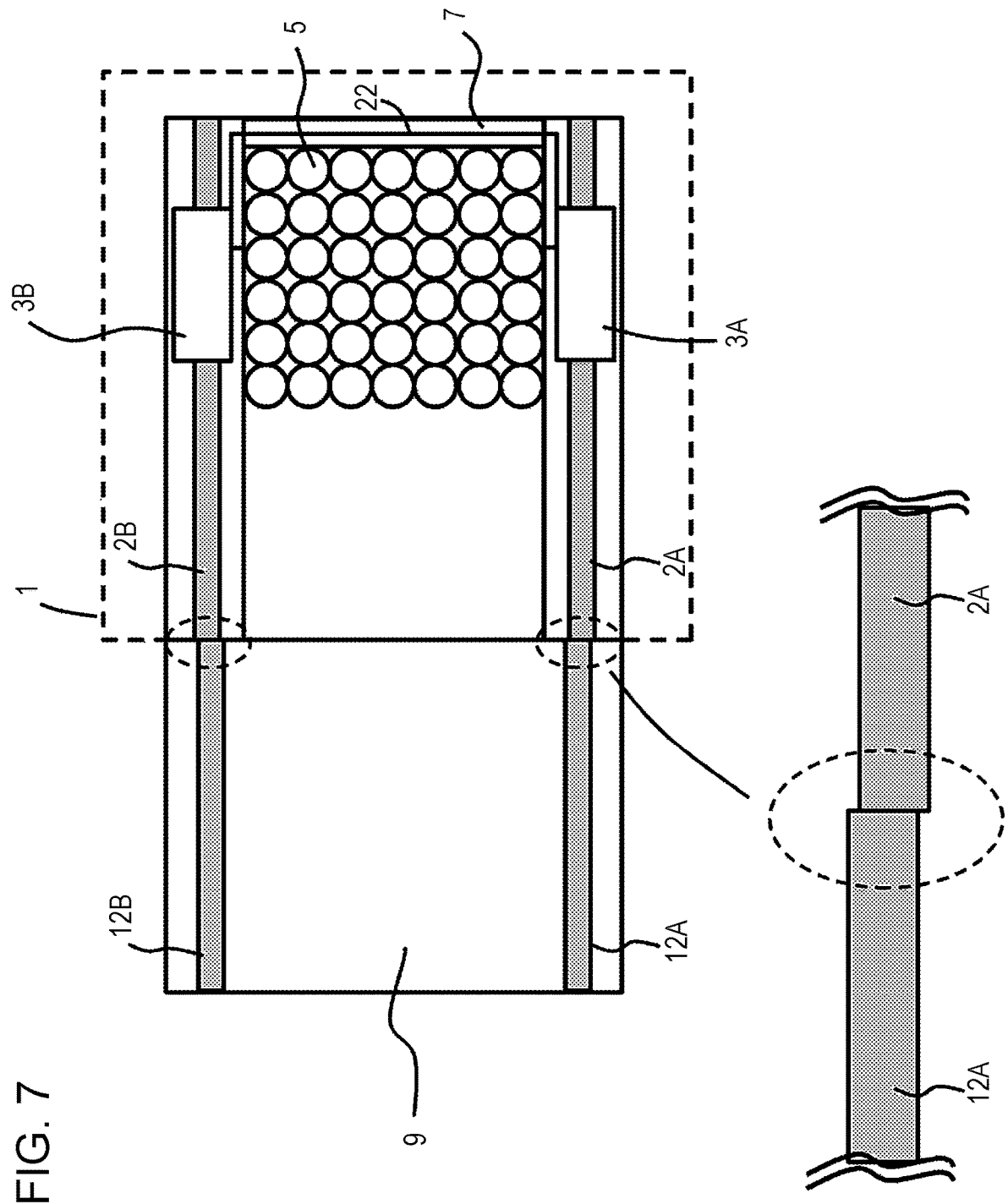
FIG. 7 is a schematic top view of a conveying device according to a reference example of the embodiment.

Here, even if the conveying device is designed and manufactured such that the width between the first guide rails 2A and 2B and the width between the second guide rails 12A and 12B are the same, differences may occur between the width between the first guide rails 2A and 2B and the width between the second guide rails 12A and 12B due to, for example, assembly errors or a difference between the temperature inside the furnace 1 and the temperature outside the furnace 1. However, as shown in FIG. 7, when the first guide rail 2A and the second guide rail 12A are connected to each other and the first guide rail 2B and the second guide rail 12B are connected to each other while the width between the first guide rails 2A and 2B and the width between the second guide rails 12A and 12B differ from each other, a step is formed at each connection portion, as a result of which it may be difficult for the moving part 3A to move smoothly from the first guide rail 2A to the second guide rail 12A and vice versa and for the moving part 3B to move from the first guide rail 2B to the second guide rail 12B and vice versa.

Figure 8:
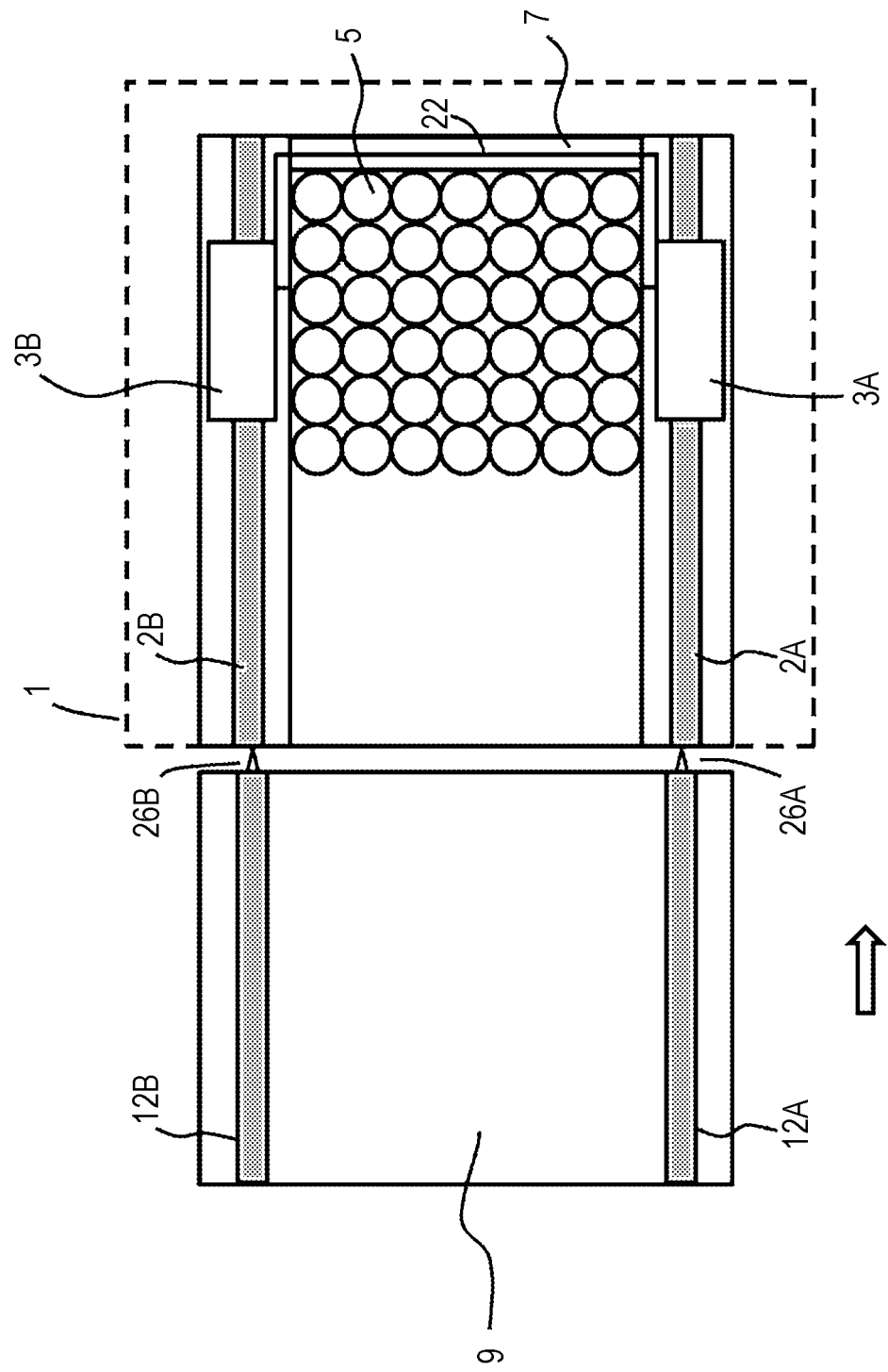
FIG. 8 is a schematic top view of the conveying device according to the embodiment.
Figure 9:
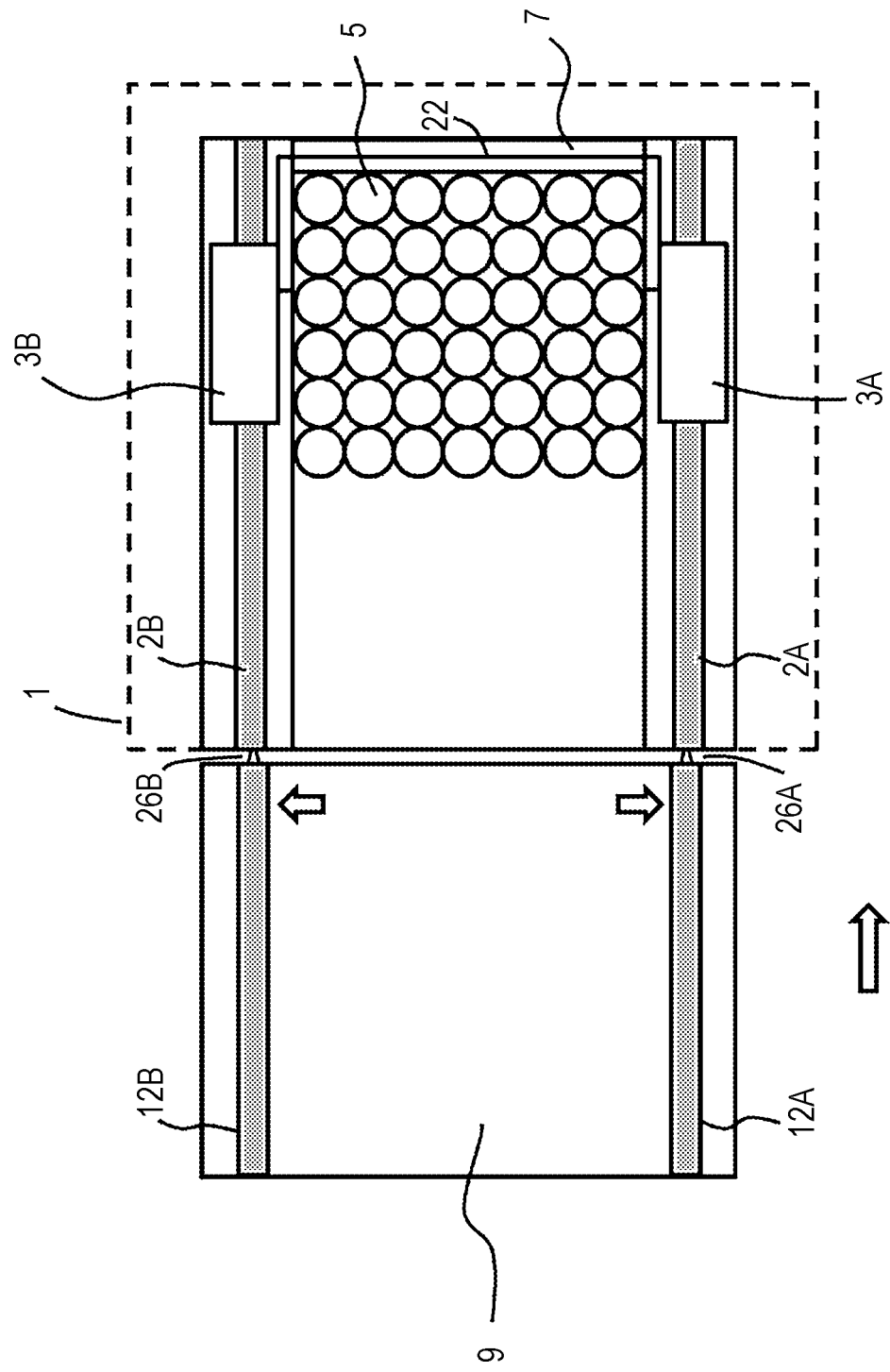
FIG. 9 is a schematic top view of the conveying device according to the embodiment.
Figure 10:
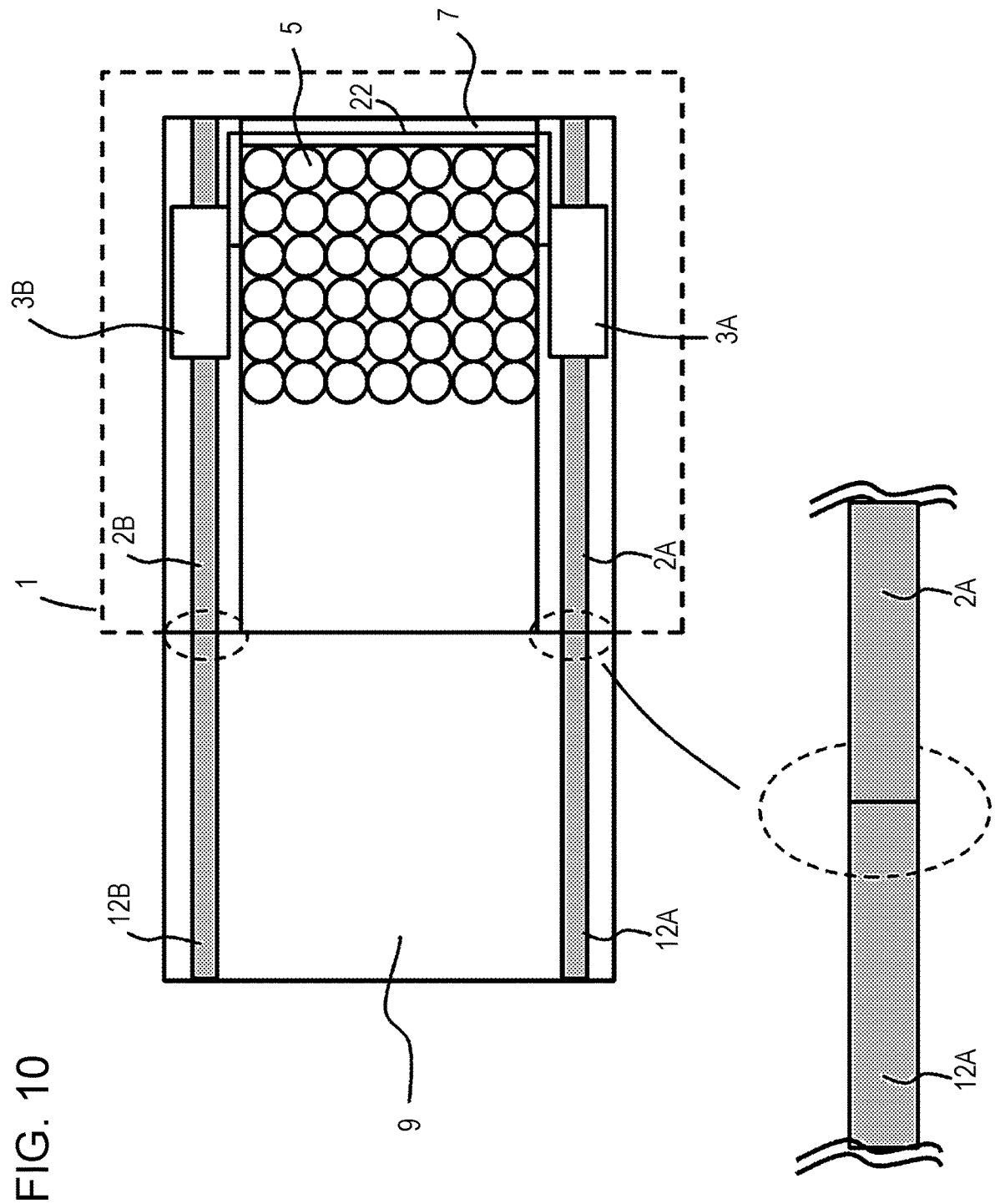
FIG. 10 is a schematic top view of the conveying device according to the embodiment.

In contrast, in the conveying device according to the embodiment, as shown in FIG. 8, when the bridge 9 approaches the table 7 inside the furnace 1, as shown in FIG. 9, the second coupler 26A of the second guide rail 12A starts to be coupled with the first coupler of the first guide rail 2A, and the second coupler 26B of the second guide rail 12B starts to be coupled with the first coupler of the first guide rail 2B. Here, forces acting in the transverse directions based on the difference between the width between the first guide rails 2A and 2B and the width between the second guide rails 12A and 12B are applied via the corresponding second couplers 26A and 26B. Therefore, the movable holding parts of the corresponding second guide rails 12A and 12B are deformed in the transverse directions. Consequently, as shown in FIG. 10, when the connection between the first guide rail 2A and the second guide rail 12A and the connection between the first guide rail 2B and the second guide rail 12B have been completed, the width between the second guide rails 12A and 12B is corrected to be the same as the width between the first guide rails 2A and 2B. Thus, the moving part 3A is capable of smoothly moving from the first guide rail 2A to the second guide rail 12A and vice versa and the moving part 3B is capable of smoothly moving from the first guide rail 2B to the second guide rail 12B and vice versa.

FIGS. 8 and 9 each show an example in which, when the bridge 9 is separated from the table 7, the width between the second guide rails 12A and 12B is narrower than the width between the first guide rails 2A and 2B. In contrast, as shown in FIGS. 11 and 12, even if the width between the second guide rails 12A and 12B is wider than the width between the first guide rails 2A and 2B, after the connection between the first guide rail 2A and the second guide rail 12A and the connection between the first guide rail 2B and the second guide rail 12B have been completed, the width between the second guide rails 12A and 12B is corrected to be the same as the width between the first guide rails 2A and 2B.

Other Embodiments

Although the present invention has been described on the basis of an embodiment as in the foregoing description, the description and figures that define part of this disclosure are not to be construed as limiting the invention. On the basis of this disclosure, various alternative embodiments, examples, and operational technologies should be apparent to any person having ordinary skill in the art. For example, articles to be conveyed into and out of the furnace 1 are not limited to medicines, and may be, for example, food, drinks, or precision components, or various other articles. The furnace 1 is not limited to a freezing drying furnace, and may be a fermentation furnace or various other types of furnaces in which suppression of uneven internal temperature distribution and suppression of dust generation are desired. A mechanism that moves the moving parts may be a direct-driven motor. In this way, it is to be understood that the present invention also encompasses, for example, other embodiments that are not described here.

REFERENCE SIGNS LIST 1 furnace
2A, 2B, 12A, 12B guide rail
3A, 3B moving part
5 article
7 table
9 bridge
13A movable holding part
22 contact member
23A, 24A deformable member
25A fixing member
26A, 26B coupler

The invention claimed is:

1. A conveying device, comprising:
a first guide rail;
a second guide rail connected to the first guide rail;
a movable holding part that holds the second guide rail such that the second guide rail is movable in a transverse direction with respect to a longitudinal direction of the second guide rail; and
a moving part that moves by being guided by the first guide rail and the second guide rail.

2. The conveying device according to claim 1, wherein the movable holding part includes a deformable member disposed parallel to the longitudinal direction of the second guide rail and deformable in the transverse direction with respect to the longitudinal direction of the second guide rail, and
wherein the second guide rail is disposed on the deformable member.

3. The conveying device according to claim 2, wherein the deformable member is plate-shaped.

4. The conveying device according to claim 2, wherein the deformable member is made of a flexible material.

5. The conveying device according to claim 1, further comprising
a coupler provided at an end portion of the second guide rail and configured to couple with the first guide rail.

6. The conveying device according to claim 1, wherein the first guide rail is disposed inside a furnace, and the second guide rail is disposed outside the furnace.

7. The conveying device according to claim 6, wherein the first guide rail is disposed along a table that is disposed inside the furnace.

8. The conveying device according to claim 6, wherein the second guide rail is disposed on a bridge that is disposed outside the furnace, and the bridge is movable.

9. The conveying device according to claim 1, further comprising a contact member connected to the moving part to move an article by coming into contact with the article.

* * * * *